(12) United States Patent
Lee

(10) Patent No.: US 8,155,694 B2
(45) Date of Patent: Apr. 10, 2012

(54) DUAL STANDBY MODE MOBILE TERMINAL AND COMMUNICATION MODE CONTROL METHOD THEREOF

(75) Inventor: Ki Yong Lee, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 526 days.

(21) Appl. No.: 12/237,523

(22) Filed: Sep. 25, 2008

(65) Prior Publication Data

US 2009/0093269 A1 Apr. 9, 2009

(30) Foreign Application Priority Data

Oct. 5, 2007 (KR) .................. 10-2007-0100365

(51) Int. Cl.
*H04M 1/00* (2006.01)
(52) U.S. Cl. ............... 455/552.1; 455/550.1; 455/419; 455/410; 455/466; 455/558; 235/382
(58) Field of Classification Search ............ 455/552.1; 235/382
See application file for complete search history.

(56) References Cited

U.S. PATENT DOCUMENTS

| | | | |
|---|---|---|---|
| 2008/0064443 A1* | 3/2008 | Shin et al. | 455/558 |
| 2008/0182615 A1* | 7/2008 | Xue et al. | 455/552.1 |

FOREIGN PATENT DOCUMENTS

CN 1997192 A 7/2007
* cited by examiner

*Primary Examiner* — Kamran Afshar
*Assistant Examiner* — Sayed T Zewari
(74) *Attorney, Agent, or Firm* — Jefferson IP Law, LLP

(57) ABSTRACT

A dual standby mode mobile terminal having a single smart card slot and communication mode control method thereof is provided for enabling the mobile terminal to operate in dual standby mode with a single smart card. A dual standby mode mobile terminal includes a first control unit for controlling a first communication mode, a second control unit for controlling a second communication mode, a removable dual mode smart card containing first and second communication mode data, and a buffer for loading the first and second communication mode data. A communication mode control method for the dual standby mode mobile terminal includes loading the first and second communication mode data in the buffer from the dual mode smart card under the control of the first control unit, detecting an event requiring communication mode data provided by the dual mode smart card, determining whether the communication data are any of the first and second communication mode data loaded in the buffer, and executing the event using the communication mode data loaded in the buffer. The dual standby mode mobile terminal and communication mode control method thereof enables the mobile terminal to stand by in two different communication modes (e.g. GSM and CDMA modes) with a single smart card.

21 Claims, 7 Drawing Sheets

DUAL STANDBY MODE MOBILE TERMINAL AND COMMUNICATION MODE CONTROL METHOD THEREOF

PRIORITY

This application claims the benefit under 35 U.S.C. §119 (a) of an Korean patent application filed in the Korean Intellectual Property Office on Oct. 5, 2007 and assigned Serial No. 2007-0100365, the entire disclosure of which is hereby incorporated by reference.

BACKGROUND OF THE INVENTION

1. Field of the Invention

The present invention relates to a dual standby mode mobile terminal. More particularly, the present invention relates to a dual standby mode mobile terminal having a single smart card slot and communication mode control method thereof that enables the mobile terminal operates in dual standby mode with a single smart card.

2. Description of the Related Art

A dual mode mobile terminal supports communications with two different mobile communication systems such as a Global System for Mobile communications (GSM) system and a Code Division Multiple Access (CDMA) system.

Typically, the dual mode mobile terminal supporting the GSM system and the CDMA system is equipped with a single communication processor such that the dual mode mobile terminal operates in only one of GSM and CDMA communication modes at a time. In order to overcome this problem, dual mode dual standby (or dual standby mode) mobile terminals are developed. Such a dual standby mode mobile terminal enables the mobile terminal stands by in two communication modes, e.g. GSM and CDMA modes, simultaneously.

FIG. 1 illustrates a configuration of a conventional dual standby mode mobile terminal.

Referring to FIG. 1, the conventional mobile terminal includes two smart card receivers 560 and 565 for receiving two smart cards 570 and 575, two radio frequency (RF) modules 510 and 520, two controllers 530 and 540 such that the controllers 530 and 540 control the communications with respective communication systems independently, and an inter-process communication unit 550.

As described above, the conventional dual standby mode mobile terminal requires two smart card receivers 560 and 565 for receiving two smart cards 570 and 575, and the communication mode of the mobile terminal is determined according to the smart cards inserted into the smart card receivers 560 and 565. For example, if a User Identity Module (UIM) card was inserted to one of the smart card receivers 560 and 565 and a Subscriber Identity Module (SIM) card was inserted to the other, the dual standby mode mobile terminal operates in both the CDMA and GSM standby modes.

However, the conventional dual standby mode mobile terminal has drawbacks in that the doubled number of components, i.e. smart card receivers, makes it difficult to manufacture the mobile terminal in compact and slim design and increases manufacturing cost.

SUMMARY OF THE INVENTION

An aspect of the present invention is to address at least the above-mentioned problems and/or disadvantages and to provide at least the advantages described below. Accordingly, an aspect of the present invention is to provide a dual standby mode mobile terminal and control method thereof that is capable of reducing a number of internal components without compromising dual standby mode function, thereby reducing manufacturing cost and achieving slim and compact design.

In accordance with an aspect of the present invention, a dual standby mode mobile terminal is provided. The terminal includes a detachable dual mode smart card containing first communication mode data required for a first communication mode and second communication mode data required for a second communication mode, a buffer for loading at least one of the first and second communication mode data, a first control unit for controlling loading the first and second communication mode data and controlling the first communication mode using the first communication mode data loaded in the buffer, and a second control unit for controlling the second communication mode using the second communication mode data.

In accordance with another aspect of the present invention, a communication mode control method for a dual standby mode mobile terminal including a first control unit for controlling a first communication mode, a second control unit for controlling a second communication mode, a removable dual mode smart card containing first and second communication mode data, and a buffer for loading the first and second communication mode data is provided. The method includes loading the first and second communication mode data in the buffer from the dual mode smart card under the control of the first control unit, detecting, at the first and second control units, an event requiring communication mode data provided by the dual mode smart card, determining, when the event requiring communication mode data is detected by one of the first and second control units, whether the communication data are any of the first and second communication mode data loaded in the buffer, and executing, if the communication data are not included in the first and second communication mode data, the event using the communication mode data loaded in the buffer.

In accordance with another aspect of the present invention, a communication mode control method for a multiple mode multiple standby mobile terminal including a removal multiple mode smart card containing multiple communication mode data and a buffer for loading the multiple communication mode data is provided. The method includes loading the multiple communication mode data from the multiple mode smart card in the buffer, detecting an event requiring communication mode data provided by the multiple mode smart card, determining whether the communication data are included in the multiple communication mode data loaded in the buffer, and executing, if the communication mode data are included in the multiple communication mode data loaded in the buffer, the event using the multiple communication mode data, and executing, if the communication mode data are not included in the multiple communication mode data loaded in the buffer, the event using data retrieved from the multiple mode smart card in real time.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In the following description, a GSM mode, a CDMA mode, and a mobile communication mode are not limited for wireless communication operations but include application functions performed in the respective communication modes. Also, events triggering access to a dual mode smart card may include not only communication-related events but also other application function execution events.

Although the mobile terminal is configured to operate in dual standby mode of the GSM and CDMA system, the present invention is not limited thereto. For example, the dual standby mode mobile terminal can be configured to operate in a dual standby mode supporting at least two of CDMA, GSM, Wideband CDMA (WCDMA), and Wireless Broadband (WiBro) systems, simultaneously. That is, the mobile terminal can be configured to operate in the dual standby mode of a GSM-CDMA pair, a GSM-GSM pair, a CDMA-CDMA pair, GSM-WCDMA pair, CDMA-WCDMA pair, and WCDMA-WCDMA pair.

Also, the mobile terminal can be configured to operate in multiple standby mode supporting more than two communication systems with a smart card supporting corresponding communication systems.

Figure 1:
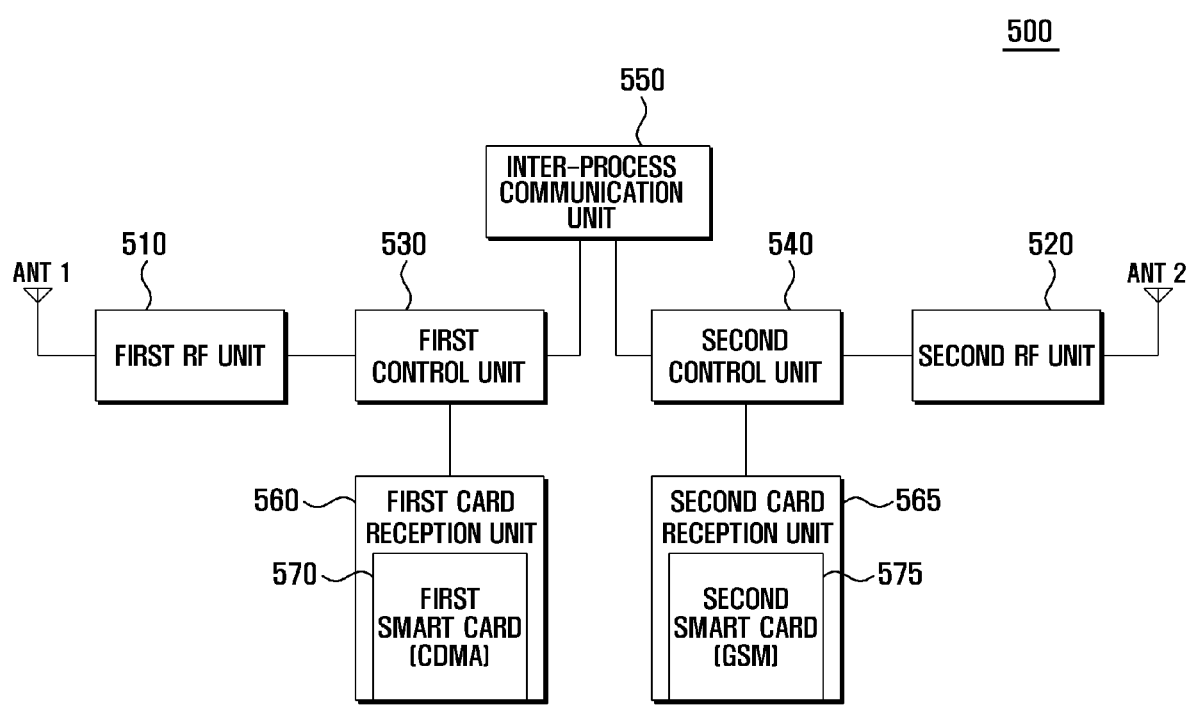
FIG. 1 is a block diagram illustrating a configuration of a conventional dual standby mode mobile terminal.
Figure 2:
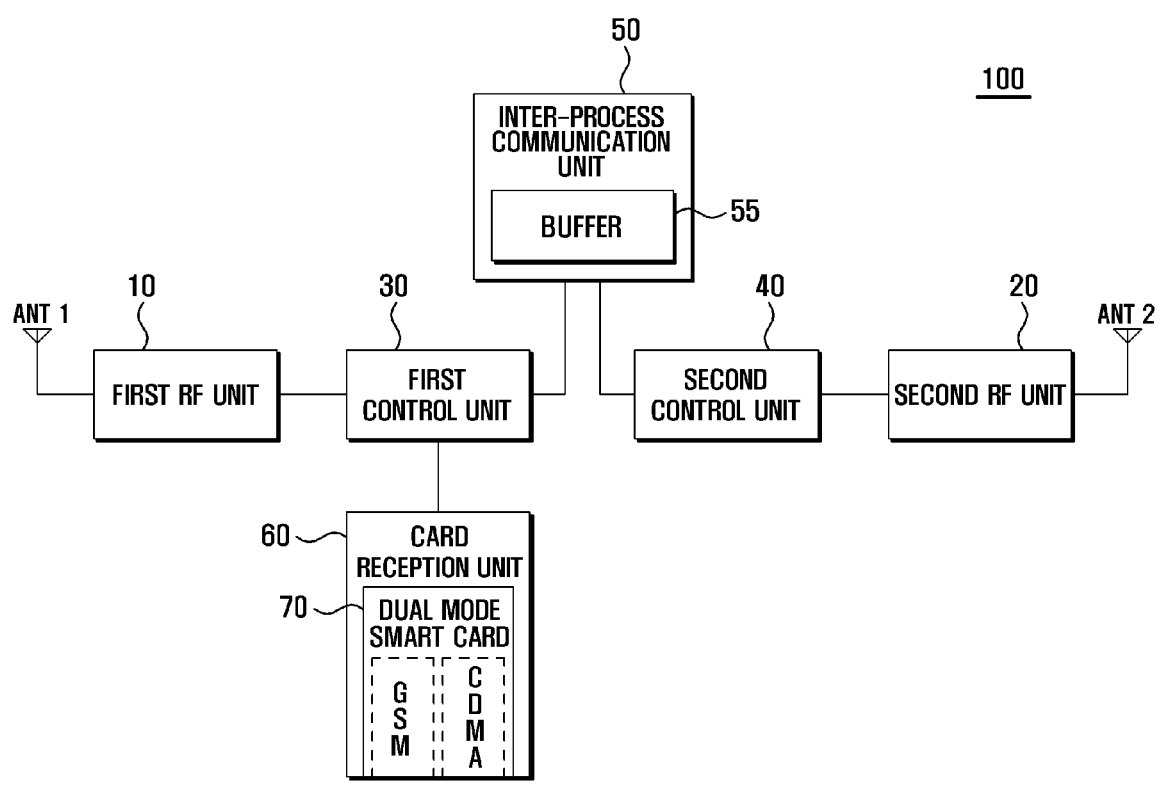
FIG. 2 is a block diagram illustrating a configuration of a dual standby mode mobile terminal according to an exemplary embodiment of the present invention.

FIG. 2 is a block diagram illustrating a configuration of a dual standby mode mobile terminal according to an exemplary embodiment of the present invention.

Referring to FIG. 2, the dual standby mode mobile terminal includes a first RF unit 10, a second RF unit 20, a first control unit 30, a second control unit 40, an inter-process communication unit 50 including a buffer 55, and a card reception unit 60 for receiving a dual mode smart card 70.

The first and second RF units 10 and 20 are tuned to the frequency bands of GSM and CDMA systems, respectively. Each of the first and second RF units 10 and 20 is provided with an RF transmitter for up-converting and amplifying transmitted signals, an RF receiver for low noise amplifying and down-converting received signals, an antenna (ANT1 or ANT2), and a duplexer (not shown) for separating the transmission and reception signals.

The first control unit 30 controls GSM functions, and the second control unit 40 controls CDMA functions. Each of the first and second control units 30 and 40 can be implemented with a microcontroller chip for radio communications such as Mobile Station Modem (MSM) chip of Qualcomm. Each of the first and second control units 30 and 40 is provided with a data processing module including a modem and a codec. The codec includes at least one of data codec for processing packet data and audio codec for processing audio data including voice. The first and second control units 30 and 40 controls to encode and modulate the transmitted signals and demodulate and decode the received signals. Here, the data processing modules can be implemented separately from the first and second RF units 10 and 20.

Each of the first and second control units 30 and 40 monitors occurrence of events requiring access to the dual mode smart card 70, determines whether the data required from the dual mode smart card 70 are loaded on the buffer 55, and executes, if the required data are loaded in the buffer 55, event with the data retrieved from the buffer 55.

In the case of the first control unit 30, if the required data are not loaded in the buffer 55, the first control unit 30 retrieves the data from the dual mode smart card 70 and executes the event with the retrieved data. In the case of the second control unit 40, if the required data are not loaded in the buffer 55, the second control unit 40 retrieves the required data from the dual mode smart card 70 via an interface of the first control unit 30.

One of the first and second control units 30 and 40 is configured as a primary control unit for controlling the internal components of the mobile terminal. The primary control unit can configured fixedly or selectively according to the event. For example, the first control unit 30 is configured as the primary control unit, when received a GSM call, to process the GSM call, and the second control unit 40 is configured as the primary control unit, when received a CDMA call, to process the CDMA call.

The inter-process communication unit 50 provides a communication interface between the first and second control unit 30 and 40. The inter-process communication unit 50 is implemented with a Dual-Port Random Access Memory (DPRAM), and connects the first and second control units 30 and 40 through an interface such as a Universal Serial Bus On-The-Go (USB OTG) interface and the like.

The card reception unit 60 provides a card interface between the first control unit 30 and the dual mode smart card 70. If the dual mode smart card 70 is mounted in the card reception unit 60, the card reception unit 60 inputs a control signal to the dual mode smart card 70 and a signal output by the dual mode smart card 70 to the first control unit 30 under the control of the first control unit 30. The card reception unit 60 is provided with a slot such that the dual mode smart card 70 is inserted into the slot detachably.

The dual mode smart card 70 is configured to support both the GSM and CDMA modes simultaneously. The dual mode smart card 70 contains first communication mode data associated with the GSM mode and second communication mode data associated with the CDMA mode. The first and second communication mode data includes subscriber information and authentication information for respective the GSM and CDMA communications and communication log information.

The data contained in the dual mode smart card 70 is managed by a file system composed of basic forms of a Master File (MF), a Dedicated File (DF), and an Elementary File (EF). MF is a root file of the file system. DF is a subdirectory file of MF for supporting functions required by telecommunication services. DF includes a plurality of EFs containing data to be used by the services. EF is a file containing actual data for executing an application file of DF. EF contains subscriber information including a subscriber's phone number, billing information, frequently used phone numbers, and authentication information.

The buffer 55 buffers the first and second communication mode data retrieved from the dual mode smart card 70 when the mobile terminal is turned on or a new dual mode smart card is attached to the mobile terminal. The buffer 55 maintains the first and second communication mode data while the mobile terminal 100 is turned on. The buffer 55 may be integrated into the inter-processor communication unit 50 or a memory region assigned in the DPRAM.

The buffer 55 can store the EFs associated with the GSM and CDMA modes under the control of the control unit 30.

In an exemplary implementation, the GSM-related EFs contain an International Mobile Subscriber Identifier (IMSI), a Ciphering Key Kc, a Home Public Land Mobile Network Search Period (HPLMN)), a HPLMN Access Technology (HLPLMNACT), a SIM service Table, a GPRS Ciphering Key (KcGPRS), GPRS Location Information (LOCIGPRS), an Operator Controlled PLMN Selector with Access Technology (OPLMNWACT), Broadcast Command Channels (BCCH), an Access Control Class (ACC), a Forbidden Public Land Mobile Network (FPLMN), Location Information (LOCI), Administrative Data (AD), an Phase Identification, a Public Land Mobile Network (PLMN), a PLMN Access Technology (PLMNACT), and the like. Also, CDMA-related EFs contain a MIN-Based International Mobile Subscriber Identity (IMSI_M), a "TRUE" international Mobile Subscriber Identity not associated MIN (IMSI_T), a CDMA Service Table, and the like.

Figure 3:
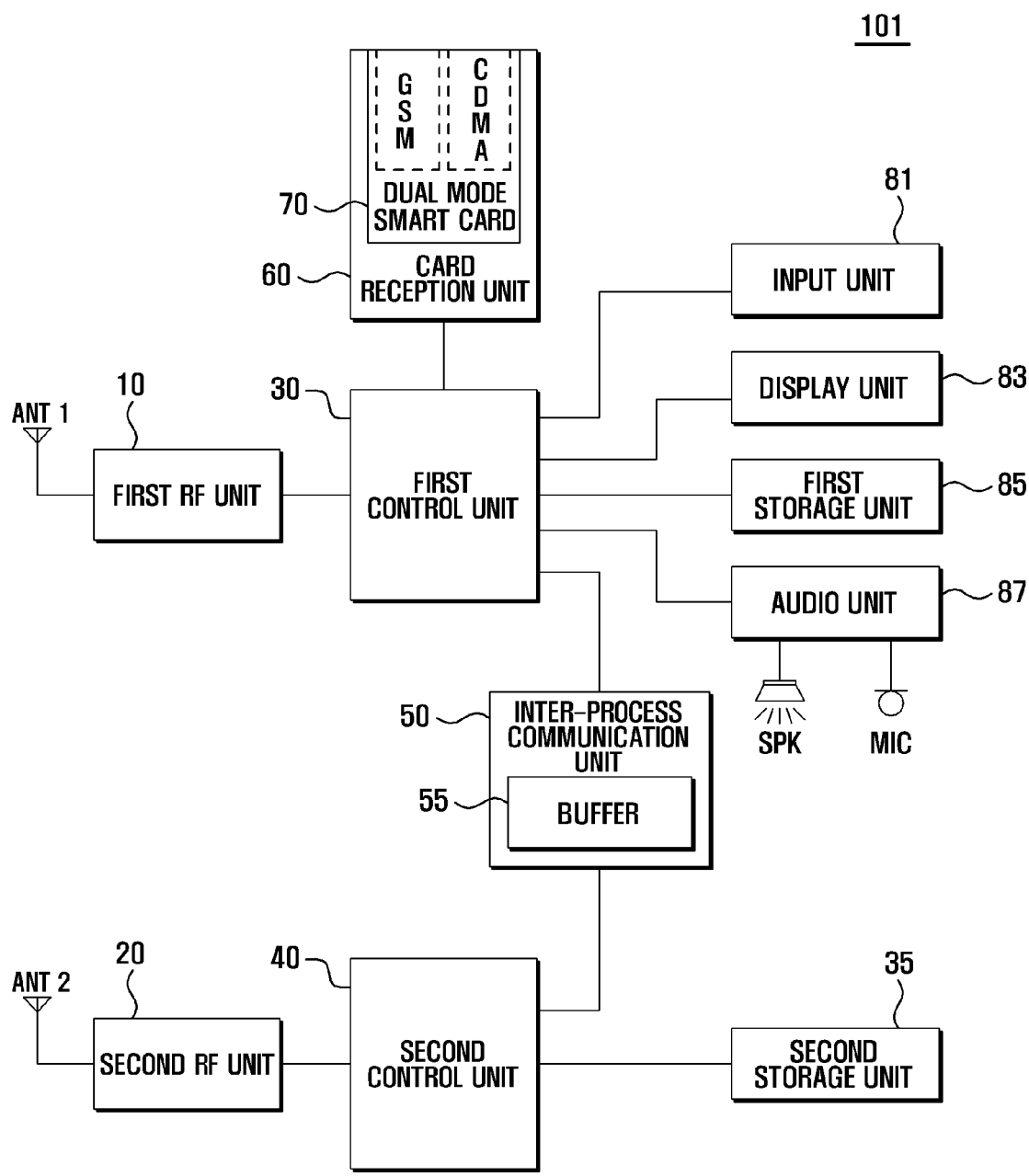
FIG. 3 is a block diagram illustrating a configuration of a dual standby mode mobile terminal according to an exemplary embodiment of the present invention.

FIG. 3 is a block diagram illustrating a configuration of a dual standby mode mobile terminal according to an exemplary embodiment of the present invention.

Referring to FIG. 3, the dual standby mode mobile terminal 101 further includes an input unit 81, a display unit 83, a first storage unit 85, an audio unit 87 that are controlled by the first control unit 30, and a second storage unit 35 that is controlled by the second control unit 40.

The input unit 81 generates command signals associated with the operations of the mobile terminal 101. The input unit 81 may be implemented with at least one of a keypad, touchscreen, and touchpad.

The display unit 83 outputs video data received from the first control unit 30 or the second control unit 40 in the form of visual image. The display unit 83 displays various information related to the operations of the mobile terminal such as communication-related information, incoming and outgoing call notification information, phonebook data, a call alert message. The display unit 83 also displays an operation status and configured options of the mobile terminal and application execution and execution result screens. The display unit 83 may be implemented with a Liquid Crystal Display (LCD) device, Organic Light Emitting Diodes (OLED), and a Plasma Display Panel (PDP).

The audio unit 87 is provided with an audio output device such as speaker (SPK) for outputting the audio signal received from the first control unit 30 and an audio input device such as microphone (MIC) for receiving an audio signal and outputting the received audio signal to the first control unit 30. The audio unit 85 is configured to process the user voice input through the microphone to be transmitted and output the voice signal received from a counterpart terminal in the form of audible sound wave.

The first and second storage units 85 and 35 store the programs and data required for executing the GSM and CDMA modes. The first and second storage units 85 and 35 are controlled by the first and second control units 30 and 40, respectively.

The dual standby mode mobile terminal 101 may further include a camera unit, a broadcast receiver unit, an external device connection unit, a power charger unit, and a multimedia unit, such as MP3, for replaying multimedia contents.

The operations of the above-structured dual standby mode mobile terminal are described hereinafter in more detail. First, the operations of the first and second control units are described, and then an exemplary method for controlling the communication modes is described. Through the following description, the communication mode control method of the dual standby mode mobile terminal may be understood more clearly and consistently.

Figure 4:
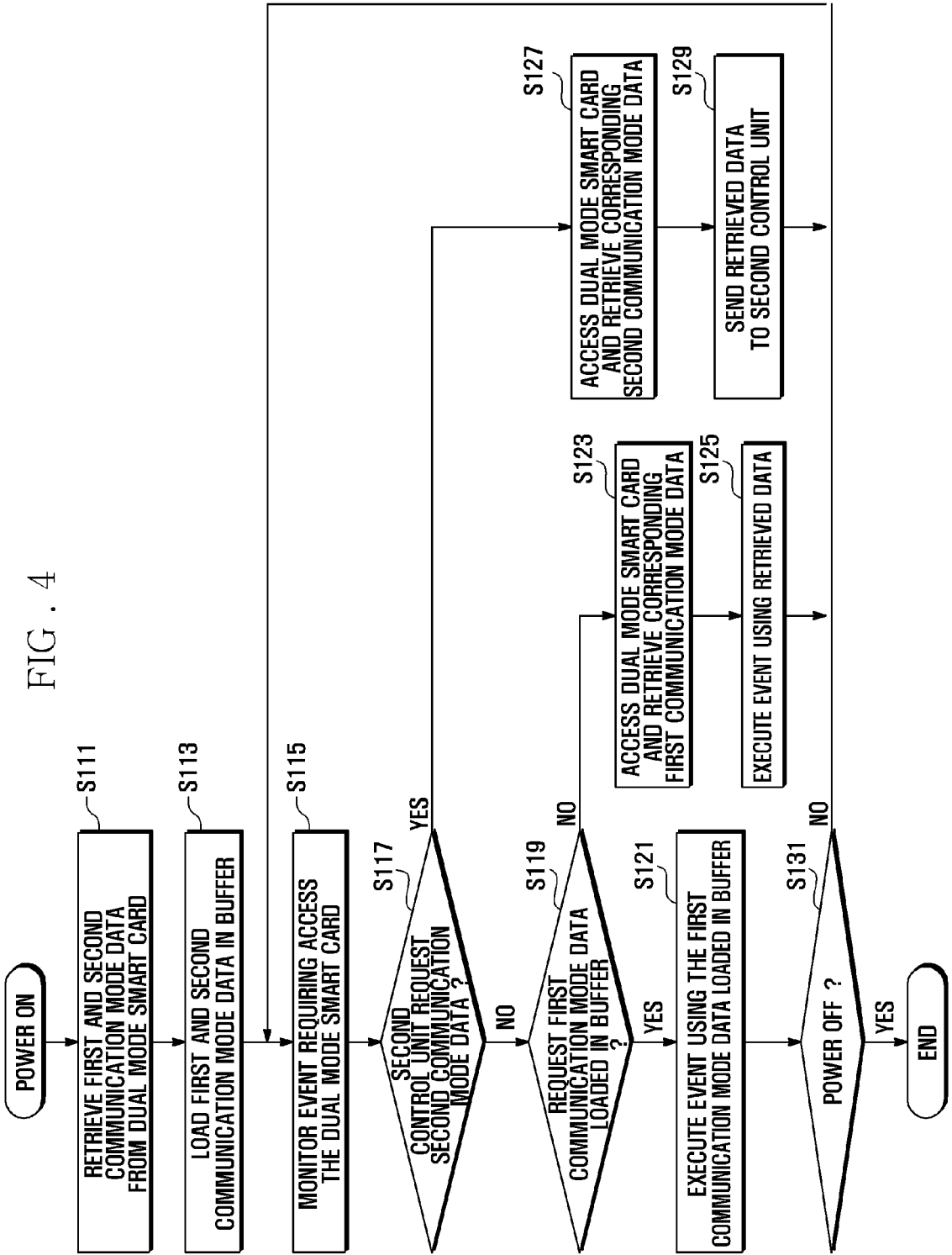
FIG. 4 is flowchart illustrating a communication mode control method for a dual standby mode mobile terminal according to an exemplary embodiment of the present invention.

FIG. 4 is flowchart illustrating a communication mode control method for a dual standby mode mobile terminal according to an exemplary embodiment of the present invention.

Referring to FIGS. 2 to 4, when the dual standby mode mobile terminal is turned on or detects the dual mode smart card 70 in the card slot, the first control unit 30 retrieves the first and second communication mode data from the dual mode smart card 70 through the interface of the card reception unit 60 in step S111. Next, the first control unit 30 controls to store the first and second communication mode data in the buffer 55 of the inter-process communication unit 50 in step S113. In this manner the first and second communication mode data contained in the dual mode smart card 70 is loaded.

The first communication mode data includes static fields of the first communication mode data (GSM) such as IMSI, Kc, HPLMN, a SIM Service Table, KcGPRS, LOCCIGPRS, BCCH, ACC, FPLMN, LOCI, AD, and a Phase Identification, and static fields of the second communication mode data (CDMA) such as IMSI_M, IMSI_T, and a CDMA service table.

After loading the first and second communication mode data, the first control unit 30 monitors to detect occurrence of events requesting access to the dual mode smart card 70 in step S115. The smart card access events include a power-on event, a GSM subscriber authentication event occurred when the dual mode smart card is attached, a GSM communication event, and a second communication mode request event.

If a smart card access event is detected, the first control unit 30 determines whether the smart card access event has occurred by the second control unit 40 in step S117.

If the smart card access event has not occurred by the second control unit 40, the first control unit 30 determines whether the smart card access event is a loaded data request event in step S119. If the smart card access event is a loaded data request event, the first control unit 30 retrieves the first communication mode data from the buffer 55 and executes the event with the retrieved data in step S121. If the smart card data is not a loaded data request event, the first control unit 30 accesses to the dual mode smart card 70 and retrieves the first communication mode data from the dual mode smart card 70 in step S123. Next, the first control unit 30 executes the event with the first communication mode data retrieved from the dual mode smart card 70 in step S125.

In contrast, if the smart card access event has occurred by the second control unit 40 at step S117, the first control unit 30 accesses to the dual mode smart card 70 and retrieves the second communication mode data from the dual mode smart card 70 in step S127. Next, the first control unit 30 forwards the second communication mode data to the second control unit 40 through the inter-process communication unit 50. The second communication mode data are the data that may be processed in the dual mode smart card 70 but not loaded in the buffer 55.

When the data requested by the smart card access event of the second control unit 40 are the data that may be obtained through an authenticating routine in real time in the dual mode smart card 70, the first control unit 30 transmits a command received from the second control unit 40 through the inter-process communication unit 50 to the dual mode smart card 70 and forwards the second communication mode data output by the dual mode smart card 70 to the second control unit 40.

In step S131, the first control unit 30 determines whether a power-off event is detected. If a power-off event is not detected, the first control unit 30 returns to step S115.

Figure 5:
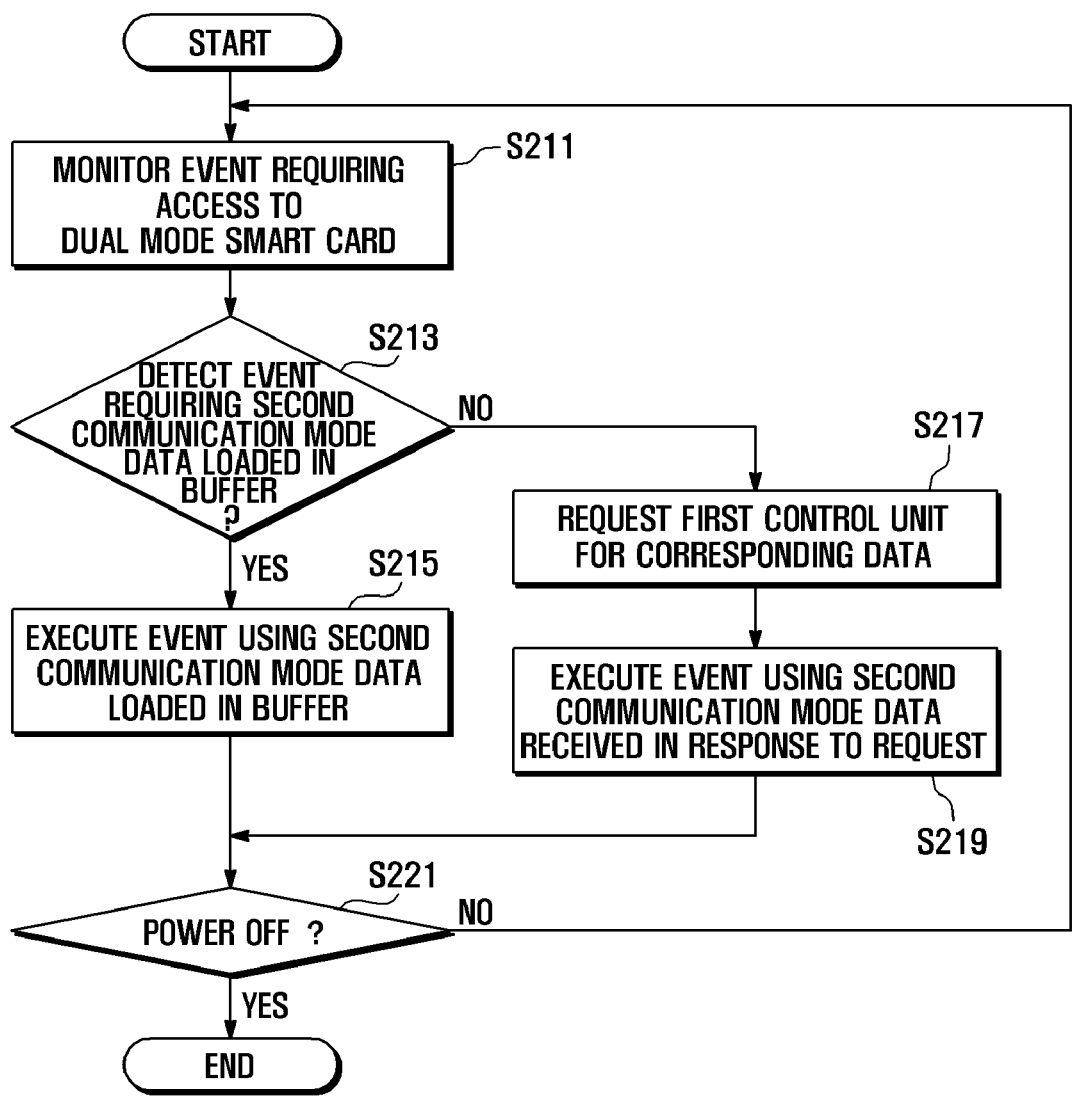
FIG. 5 is a flowchart illustrating a communication mode control method of a dual standby mode mobile terminal according to an exemplary embodiment of the present invention.

FIG. 5 is a flowchart illustrating a communication mode control method of a dual standby mode mobile terminal according to another exemplary embodiment of the present invention.

Referring to FIG. 5, when the dual standby mode mobile terminal is turned on or detects the insertion of a dual mode smart card 70, the second control unit 40 monitors to detect an occurrence of events requesting access to the dual mode smart card 70 in step S211. The smart card access events include CDMA communication events such as CDMA subscriber authentication event occurred when the dual mode smart card is attached.

If a smart card access event is detected, the second control unit 40 determines whether the smart card access event is a loaded data request event in step S213. If the smart card access event is the loaded data request event, the second control unit 40 executes the event using the second communication mode data loaded in the buffer 55 in step S215.

If the smart card access event is not the loaded data request event, the second control unit 40 issues a smart card access command to the first control unit 30 to request the second communication mode data in step S217. Next, the second control unit 40 receives the second communication mode data from the first control unit 30 via the inter-process communication unit 50 and executes the event using the second communication mode data in step S219.

In step S221, the second control unit 40 determines whether a power-off event is detected. If no power-off event is detected, the second control unit 40 returns to step S211.

Figure 6A:
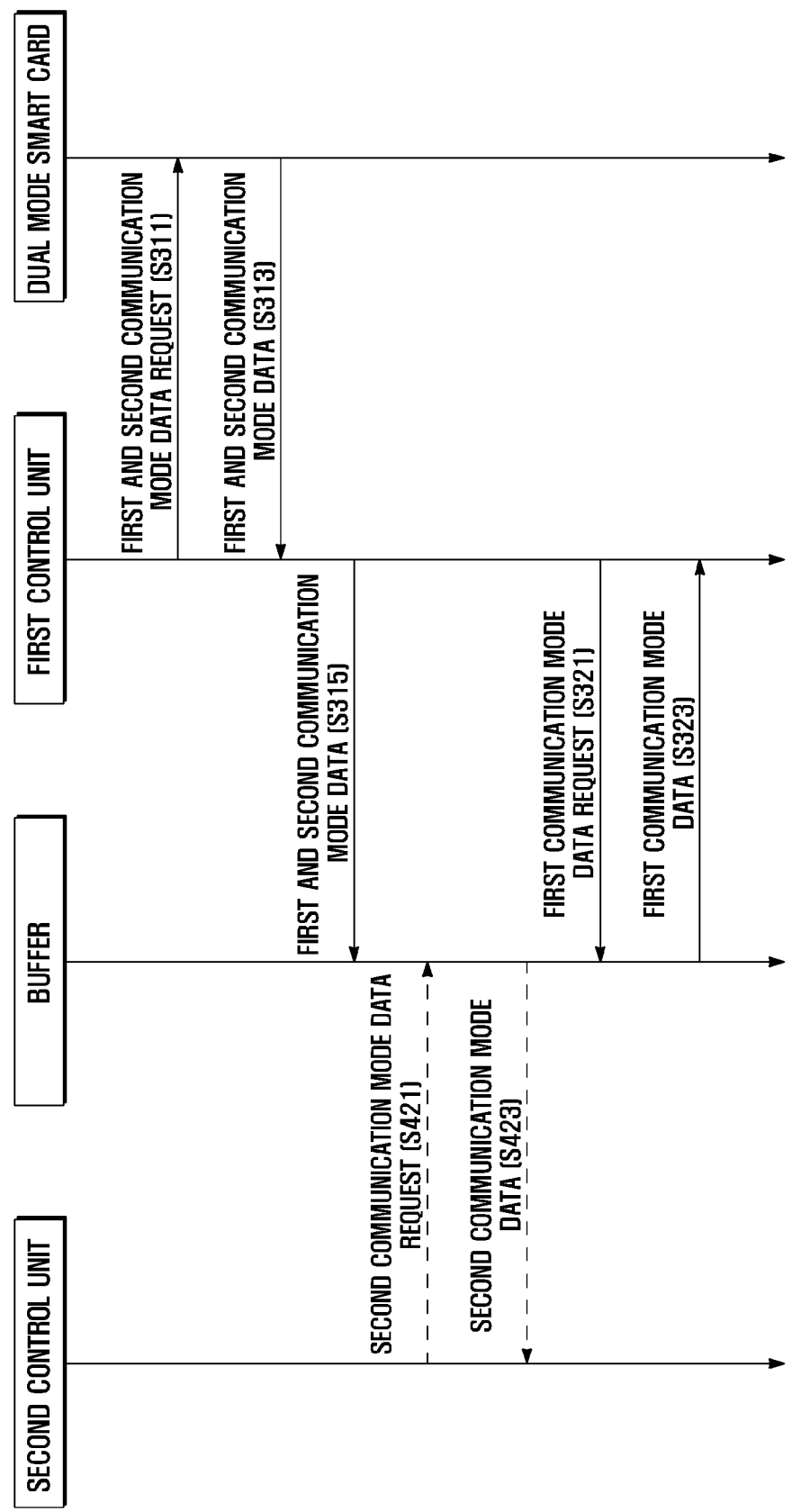
FIGS. 6A and 6B are message flow diagrams illustrating message flows in a communication mode control method for a dual standby mode mobile terminal according to an exemplary embodiment of the present invention.
Figure 6B:
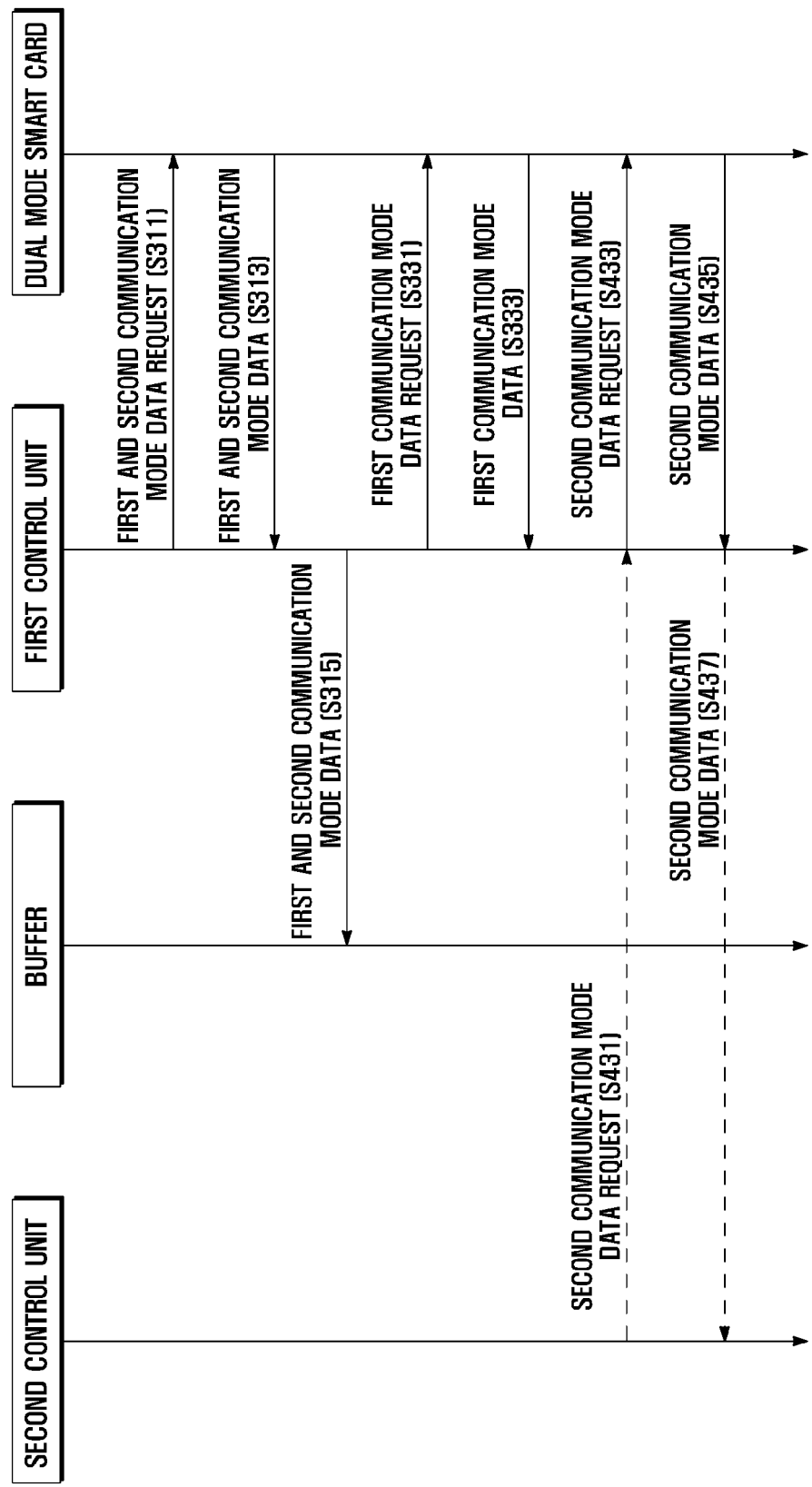

FIGS. 6A and 6B are message flow diagrams illustrating message flows in a communication mode control method for a dual standby mode mobile terminal according to an exemplary embodiment of the present invention.

FIG. 6A illustrates the case in which the data requested by an event are loaded in the buffer, and FIG. 6B illustrates the case in which the data requested by an event are not loaded in the buffer.

Referring to FIGS. 2 and 6A, the first control unit 30 issues a data request signal to the dual mode smart card 70 in step S311. Upon receipt of the data request signal, the dual mode smart card 70 sends the first and second communication mode data to the first control unit 30 in step S313. The first control unit 30 stores the first and second communication mode data received from the dual mode smart card 70 in the buffer 55 of the inter-process communication unit 50 in step S315. In this manner, the first and second communication mode data are loaded. The communication mode data loading process is performed when the dual standby mode mobile terminal is turned on or detects the insertion of the dual mode smart card 70.

After the first and second communication mode data are completely loaded in the buffer, the first and second control units 30 and 40 monitor to detect a loaded data request event requesting to access the communication mode data provided by the dual mode smart card 70. If a loaded data request event requesting the first communication mode data loaded in the buffer 55 is detected, the first control unit 30 issues a first communication mode data request command to the buffer 55 in step S321 and executes the event using the first communication mode data output in response to the first communication mode data request command in step S323.

In the meantime, the second control unit 40 monitors to detect a loaded data request event requesting to access the communication mode data provided by the dual mode smart card 70. If a loaded data request event requesting the second communication mode data loaded in the buffer 55 is detected, the second control unit 40 issues a second communication mode data request command to the buffer 55 in step S421, and executes the event using the second communication mode data output in response to the second communication mode data request command in step S423.

Referring to FIGS. 2 and 6B, after the first and second communication mode data are completely loaded through steps S311, S313 and S315, the first control unit 30 monitors to detect an unloaded first communication mode data request event requesting to access the first communication mode data that are not loaded in the buffer 55. If an unloaded first communication mode data request event is detected, the first control unit 30 issues an unloaded first communication mode data request command to the dual mode smart card 70 via the card interface of the card reception unit 60 in step S331. Upon receipt of the unloaded first communication mode data request command, the dual mode smart card 70 outputs the unloaded first communication mode data to the first control unit 30 such that the first control unit 30 executes the event using the first communication mode data received from the dual mode smart card 70 in step S333.

In the meantime, the second control unit 40 monitors to detect an unloaded second communication mode data request event requesting to access the second communication mode data that are not loaded in the buffer 55. If an unloaded second communication mode data request event is detected, the second control unit 40 issues an unloaded second communication mode data request command to the first control unit 30 in step S431. The first control unit 30 forwards the unloaded second communication mode data request command to the dual mode smart card 70 in step S433. Upon receipt of the unloaded second communication mode data request command, the dual mode smart card 70 outputs the unloaded second communication mode data to the first control unit 30 in step S435, and the first control unit 30 forwards the unloaded second communication mode data to the second control unit 40 in step S437. Consequently, the second control unit 40 executes the event using the second communication mode data received from the dual mode smart card 70.

While the present invention has been shown and described with reference to certain exemplary embodiments thereof, it will be understood by those skilled in the art that various changes in form and details may be made therein without departing from the spirit and scope of the invention as defined in the appended claims and their equivalents.

As described above, the dual standby mode mobile terminal and communication mode control method thereof according to the present invention enables the mobile terminal to stand by in two different communication modes (e.g. GSM and CDMA modes) with a single card slot and single smart card, resulting in reduction of terminal size and manufacturing cost.

What is claimed is:

1. A dual standby mode mobile terminal, the terminal comprising:
   a single detachable dual mode smart card containing first communication mode data required for a first communication mode and second communication mode data required for a second communication mode;
   a buffer for loading at least one of the first and second communication mode data;
   a first control unit for controlling loading the first and second communication mode data from the single detachable dual mode smart card, if the data are unloaded in the buffer, and for controlling the first communication mode using the first communication mode data loaded in the buffer; and
   a second control unit for retrieving data from the single detachable dual mode smart card via an interface of the first control unit, if the data is unloaded in the buffer, and for controlling the second communication mode using the second communication mode data.

2. The terminal of claim 1, wherein each of the first and second control units detects events requesting to access the communication mode data, determines whether the communication mode data requested to access are loaded communication mode data, and executes, if the communication mode data requested to access are loaded communication mode data, the event using the communication mode data loaded in the buffer.

3. The terminal of claim 2, wherein the first control unit retrieves, if the communication mode data requested to access are unloaded communication mode data, the unloaded data from the dual mode smart card and executes the event using the unloaded communication mode data.

4. The terminal of claim 2, wherein the second control unit retrieves, if the communication mode data requested to access are not unloaded communication mode data, the unloaded data from the dual mode smart card and executes the event using the unloaded communication mode data.

5. The terminal of claim 1, wherein the first communication mode is one of a Code Division Multiple Access (CDMA) communication mode and a Global System for Mobile communication (GSM) communication mode, and the second communication mode is the other.

6. The terminal of claim 5, wherein the first and second communication mode data are stored in the form of an Element File (EF).

7. The terminal of claim 6, wherein the first communication mode data comprises GSM communication mode data including an International Mobile Subscriber Identifier (IMSI), Ciphering Key Kc, a Home Public Land Mobile Network Search Period (HPLMN), a HPLMN Access Technology (HLPLMNACT), a SIM service Table, a GPRS Ciphering Key (KcGPRS), GPRS Location Information (LOCIGPRS), an Operator Controlled PLMN Selector with Access Technology (OPLMNWACT), Broadcast Command Channels (BCCH), an Access Control Class (ACC), a Forbidden Public Land Mobile Network (FPLMN), Location Information (LOCI), Administrative Data (AD), an Phase Identification, a Public Land Mobile Network (PLMN), and a PLMN Access Technology (PLMNACT).

8. The terminal of claim 6, wherein the second communication mode data comprises CDMA communication mode data including a MIN-Based International Mobile Subscriber Identity (IMSI_M), a "TRUE" International Mobile Subscriber Identity not associated MIN (IMSI_T), and a CDMA Service Table.

9. The terminal of claim 1, wherein the first control unit stores the first communication mode data in the buffer and executes the first communication mode using the first communication mode data stored in the buffer, and the second control unit executes the second communication mode using data retrieved from the dual mode smart card in real time on demand.

10. The terminal of claim 1, further comprising a third control unit, wherein the second control unit stores the second communication mode data in the buffer and executes the second communication mode using the second communication mode data stored in the buffer, the dual mode smart card further contains third communication mode data, the first control unit loads the third communication mode data in the buffer, and the third control unit executes the event using the third communication mode data loaded in the buffer.

11. The terminal of claim 1, further comprising an inter-process communication unit for providing a communication interface between the first and second control units.

12. The terminal of claim 11, wherein the inter-process communication unit is implemented with a Dual-Port Random Access Memory (DPRAM).

13. The terminal of claim 11, wherein the communication interface comprises a Universal Serial Bus On-The-Go (USB OTG) interface.

14. A communication mode control method for a dual standby mode mobile terminal including a first control unit for controlling a first communication mode, a second control unit for controlling a second communication mode, a single removable dual mode smart card containing first and second communication mode data, and a buffer for loading the first and second communication mode data, the method comprising:
   loading the first and second communication mode data in the buffer from the single removable dual mode smart card, if the data are unloaded in the buffer, under the control of the first control unit;
   detecting, at the first and second control units, an event requiring communication mode data provided by the single removable dual mode smart card;
   determining, when the event requiring communication mode data is detected by one of the first and second control units, whether the communication data are any of the first and second communication mode data loaded in the buffer; and
   executing, if the communication data are not included in the first and second communication mode data, the event using the communication mode data loaded in the buffer.

15. The method of claim 14, further comprising:
   retrieving, if the communication mode data are not included in the first and second communication mode data, data required for the event from the dual mode smart card by the first control unit; and
   executing the event using the data retrieved from the dual mode smart card.

16. The method of claim 14, further comprising:
   retrieved, if the communication mode data are not included in the first and second communication mode data, data required for the event from the dual mode smart card by the second control unit; and executing the event using the data retrieved from the dual mode smart card.

17. The method of claim 14, wherein the first communication mode is one of a Code Division Multiple Access (CDMA) communication mode and a Global System for Mobile communication (GSM) communication mode, and the second communication mode is the other.

18. The method of claim 17, wherein the first and second communication mode data are stored in the form of an Element File (EF).

19. The method of claim 18, wherein EF contains subscriber information including a subscriber's phone number, billing information, frequently used phone numbers, and authentication information.

20. The method of claim 14, wherein the first and second communication mode data is loaded in the buffer when the mobile terminal powers on or detects insertion of the dual mode smart card.

21. A communication mode control method for a multiple mode multiple standby mobile terminal including multiple control units for controlling multiple communication modes respectively, a single removal multiple mode smart card containing multiple communication mode data and a buffer for loading the multiple communication mode data, the method comprising:

loading the multiple communication mode data from the single removal multiple mode smart card in the buffer;

detecting an event requiring communication mode data provided by the single removal multiple mode smart card;

determining whether the communication data are included in the multiple communication mode data loaded in the buffer; and executing, if the communication mode data are included in the multiple communication mode data loaded in the buffer, the event using the multiple communication mode data; and executing, if the communication mode data are not included in the multiple communication mode data loaded in the buffer, the event using data retrieved from the single removal multiple mode smart card in real time.

* * * * *